United States Patent
Nair et al.

(10) Patent No.: US 9,860,281 B2
(45) Date of Patent: Jan. 2, 2018

(54) SOCIAL-GRAPH AWARE POLICY SUGGESTION ENGINE

(71) Applicants: Jayakrishnan K. Nair, Bangalore (IN); Prasanna Venkateswaran, Kovilambakkam (IN); Simon Hunt, Naples, FL (US)

(72) Inventors: Jayakrishnan K. Nair, Bangalore (IN); Prasanna Venkateswaran, Kovilambakkam (IN); Simon Hunt, Naples, FL (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/318,637

(22) Filed: Jun. 28, 2014

(65) Prior Publication Data
US 2015/0381662 A1 Dec. 31, 2015

(51) Int. Cl.
*H04L 29/06* (2006.01)

(52) U.S. Cl.
CPC ............ *H04L 63/205* (2013.01); *H04L 63/20* (2013.01)

(58) Field of Classification Search
CPC .............................. H04L 63/20; H04L 63/205
See application file for complete search history.

(56) References Cited

U.S. PATENT DOCUMENTS

| | | | | |
|---|---|---|---|---|
| 8,776,168 B1* | 7/2014 | Gibson | ................. | H04L 63/104 709/225 |
| 2003/0046583 A1 | 3/2003 | Goldman | | |
| 2004/0064727 A1* | 4/2004 | Yadav | ................. | H04L 63/0227 726/1 |
| 2004/0193912 A1* | 9/2004 | Li | ............................ | G06F 21/55 726/14 |
| 2005/0008001 A1* | 1/2005 | Williams | ............ | H04L 12/2602 370/352 |
| 2006/0048209 A1 | 3/2006 | Shelest | | |
| 2007/0143824 A1 | 6/2007 | Shahbazi | | |

(Continued)

FOREIGN PATENT DOCUMENTS

KR 1020140051067 A 4/2014

OTHER PUBLICATIONS

International Search Report and Written Opinion received in corresponding International Application No. PCT/US2015/030922, dated Aug. 12, 2015.

(Continued)

*Primary Examiner* — Robert Leung
(74) *Attorney, Agent, or Firm* — Blank Rome, LLP

(57) ABSTRACT

Systems, devices and methods are disclosed to assist in configuring devices and policies to protect a regional network (e.g., home network) and its users. Users on the network are monitored to determine appropriate configuration settings and preferences by utilizing a combination of internally configured information and externally gathered information for each user. For example, externally gathered information may include information obtained about a user from one or more social media Internet sites. Automatically obtained information may be used to provide or augment policy information such that a user's preference relative to internet content (e.g., content blocking software configuration) may be achieved without requiring an administrator to individually prepare each users security profile and configuration.

19 Claims, 6 Drawing Sheets

(56) References Cited

U.S. PATENT DOCUMENTS

| | | | |
|---|---|---|---|
| 2007/0199044 A1 | 8/2007 | Hughes | |
| 2008/0115190 A1* | 5/2008 | Aaron | H04L 63/102 |
| | | | 726/1 |
| 2008/0115205 A1* | 5/2008 | Aaron | H04L 63/20 |
| | | | 726/14 |
| 2010/0071024 A1* | 3/2010 | Eyada | H04L 63/0263 |
| | | | 726/1 |
| 2011/0252451 A1* | 10/2011 | Turgeman | H04N 21/41407 |
| | | | 725/82 |
| 2012/0272290 A1* | 10/2012 | Zaitsev | G06F 21/552 |
| | | | 726/1 |
| 2013/0291058 A1* | 10/2013 | Wollenstein | H04L 63/20 |
| | | | 726/1 |
| 2013/0297698 A1 | 11/2013 | Odero et al. | |
| 2014/0007183 A1* | 1/2014 | Qureshi | G06F 21/10 |
| | | | 726/1 |
| 2015/0199496 A1* | 7/2015 | Deter | G06F 21/00 |
| | | | 726/1 |
| 2015/0281277 A1* | 10/2015 | May | H04L 63/10 |
| | | | 726/1 |

OTHER PUBLICATIONS

European Extended Search Report, dated Nov. 2, 2017, 10 pages.

* cited by examiner

SOCIAL-GRAPH AWARE POLICY SUGGESTION ENGINE

TECHNICAL FIELD

Embodiments described herein generally relate to configuring security policies and security software applications to assist in properly and securely allowing many different types of devices and users to connect to external networks.

BACKGROUND ART

Computer security software applications that are designed for family protection are typically driven by policies that can control the behavior of such software. Policies can be used for determining the nature and extent of protection to be offered, in addition to determining actions to be taken in case of violations, etc. There are several limitations with this approach. For example, in a home environment, every computer user has specific needs from the security software which can be based on: usage patterns, level of expertise/awareness of the user, need for supervision, etc. Different users find having customized or personalized policies beneficial. Currently, customized policies are manually created based on the best judgment of the homeowner. However, creating an appropriate security policy configuration may require an understanding of cyber-security threats, which may be very challenging for a typical homeowner acting as home network administrator.

In addition to the above mentioned issues, the typical home network will become more complex in the future. As more and more devices are connected to a home network, administration of the number of devices and number of devices needing security updates will become more complex. Home network administrators will therefore require more easily understandable and useable network administration tools than a professional network administrator.

DESCRIPTION OF EMBODIMENTS

Figure 1:
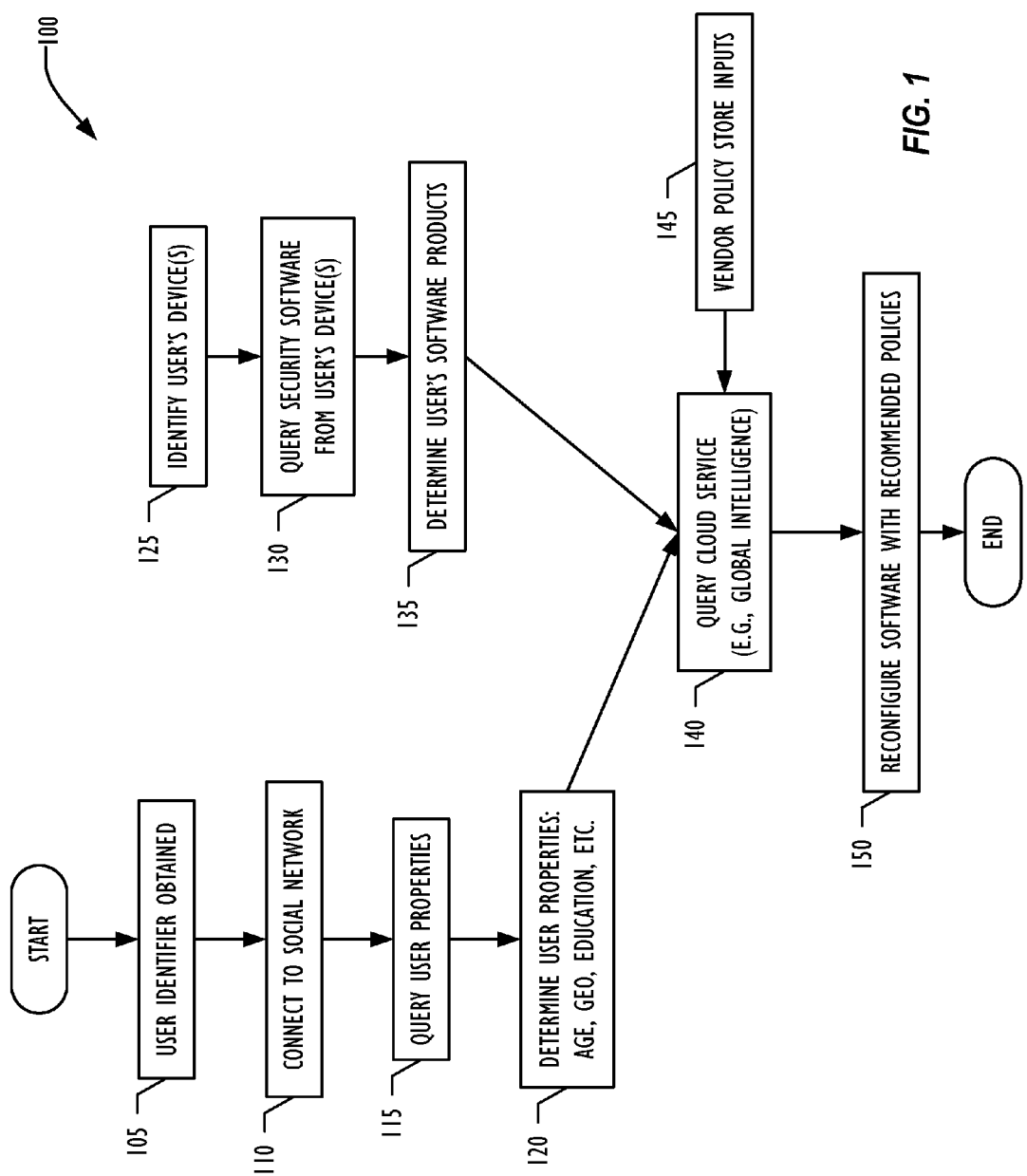
FIG. 1 is a flowchart illustrating a technique for using social network information for configuring security policies according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

Although described below in terms of a home network environment, the techniques described below are not limited to such an embodiment, but may be used in any network environment in which configuration of devices or software relative to user criteria would be beneficial. For example an Internet Service Provider (ISP) (or set of cooperating ISPs) could utilize the disclosed techniques to provide user specific security configurations to a user when that user accesses the Internet (for example) from a location other than the user's home network. In one example, the user could be using a public access point or terminal and still be provided customized security settings.

As used herein, the term "malware" refers to any software used to disrupt operation of a programmable device, gather sensitive information, or gain access to private systems or networks. Malware includes computer viruses (including worms, Trojan horses, etc.), ransomware, spyware, adware, scareware, and any other type of malicious program.

The term "homeowner" as used below includes not only a person who owns a home, but also to a person in possession of the home through renting, leasing, or other means.

Although described below in terms of security policies, the techniques disclosed below is not limited to security policies and security toold, but are applicable to and can be implemented in any policy-based system.

This disclosure addresses the issues discussed above and many more by providing a comprehensive and easy to use and understand set of administration and security tools configured to work with a consumer device attached to the home network. The disclosed consumer device can be configured to gather and utilize information to assist in configuration of customized policies for different users, using generalization regarding the security needs for most home users based upon identified properties of those users, such as age, education, profession, geography, etc.

Certain generalizations can be made regarding the security needs for most Internet users if certain properties of such Internet users are known. Characteristics such as age, education, profession, geography, etc. could be used to assist in setting and maintaining a customized security profile for a user. Additionally, social networks like Facebook, Linkedin, and Google+ are repositories for these and additional user properties. One benefit to utilizing social media information is that a user active on the Internet is quite likely to keep posted information accurate over time. For example, if a person gets a new degree they are likely to update their LinkedIn or Facebook information regarding their education. A mechanism is described below to use the social information available from one or more such networks to predict the appropriate security policies that could be applicable to a software user, without requiring an administrative user to create and assign appropriate policies to each individual in a family or organization. This administrative overhead can be time consuming and complicated, and typically requires training that the average homeowner acting as home network administrator does not have. The techniques and systems described below assist in automating a setup process and can periodically query social media repositories to keep settings and preferences current, as well as providing information for a service provider to update recommendations based upon feedback from user modifications to the recommended security policies.

Setting appropriate security policies can require specialized knowledge about the threat landscape, and many home users of security software may not be cognizant of that information. The techniques and systems described below can collect basic information about a home user, and use that knowledge to suggest appropriate policies for each user. The disclosed embodiments can also leverage a "Global Intelligence" (GI) infrastructure to maintain accurate information about particular users, their preferences, and the threat landscape. Utilizing a combination of these factors, a service provider could assist Internet users to have accurate and up to date security settings configured based on knowledge gained from social media profiles and other web sites containing information about individual users. For example, a security system may obtain information about a user from Facebook and determine that they graduated from a certain school. A query of the alumni pages for that school may provide additional information pertinent to the user. In another example, an individual may have different identifiers in different social media environments. By determining a person's real world information in a first social media environment, that same person may be found in one or more second social media environments automatically. While these are just two examples, many such multi-level information gathering and correlation techniques are consistent with the description below.

As will be understood by one of ordinary skill in the art, given the benefits of this disclosure, the following axioms can benefit a disclosed social-network aware policy suggestion engine. The security needs for an adult user may be very different from that of a teenager in the same household. A country or geography with ISP-imposed restrictions may impose different security needs than one that does not have such restrictions. A user who is in the computer security profession may need or want a different security profile than an occasional computer user. Content that is acceptable in one culture or religion may not be in another. Therefore, certain generalizations can be made regarding security needs of a computer user if sufficient data is available to categorize or profile that person into one of several broad categories. The data needed for this can include (but is not limited to) the person's age, gender, education, profession, geographical location, culture, language, religion etc.

Social Networking platforms are the most up-to-date repositories for such data for most home users. Accordingly, leveraging properties from a social platform (referred to as a "social-graph") can have several advantages. The disclosed embodiments include a set of mechanisms and algorithms for harvesting such information captured in the social-graph of the administrative user to make appropriate recommendations regarding the security configuration that suits them (and/or their users) best.

In one embodiment, a server-provided mechanism (described below as a "Recommendation Engine") predicts appropriate security policies for a person based on information available from his social graph. First, a user identifier is used to locate a user within one or more social networks. User properties are collected and aggregated from the different social networks. The list of security software belonging to the user is obtained. A hosted service provides the aggregated properties and the set of security software. The service responds with a recommended set of policies for the user for the identified software products. The products are then configured to start functioning with the recommended policies.

A second embodiment includes a mechanism to create and update a cloud repository of recommended policies. Users of one embodiment use the Recommendation Engine to get policy recommendations. The users can modify the recommended policies during the course of software usage to suit specific needs. Such modifications along with the user's profile/properties (age, language, geography, etc.) are sent to the Recommendation Engine. The Recommendation Engine can fine tune its recommendations based on aggregated modifications submitted by a set of users belonging to corresponding profile properties. For example, if many users from a specific country make similar modifications to the recommended policies, the Recommendation Engine can incorporate these modifications within the default recommendation for that country.

FIG. 1 is a flowchart 100 illustrating a technique for identification of a user in a social media environment; determining properties of that user; and using the obtained information to configure available security software. Beginning at block 105, a user identifier is obtained. The user may supply a user identifier of an associated social media networking account or may optionally supply other identifying information such as full name and city/state of residence. If the user supplies a social media identity, a connection to the social media environment may be initiated in block 110. If the user supplies identifying information other than a social media identity, a query of available information from one or more social media environments may be initiated using the other identifying information provided. For example, using a full name and city or state of residence, one or more social media environments may be queried to determine one or more user identities within those environments and prompt the user for confirmation of the determined user identities, typical user ids for logging into the social media environments. After a user identity is obtained in the one or more social media environments, the user identities may be used to connect to each social media network in block 110. If multiple user identities are available for multiple social media networks, each social media network may be contacted in a predetermined sequence or in parallel, as desired. After a connection is established with a social media environment, the social media environment is queried for user properties in block 115. The properties about the user may be obtained in block 120, typically from a user's associated user profile. The properties may include any information that may be considered useful to assist in providing configuration assistance to the user. For example, age, geographic location, education, occupation, etc. In some embodiments, the values of certain user properties may determine which other user property information to obtain from the social media network. When user properties are obtained from more than one social media network, the user properties may be aggregated into aggregated properties.

In block 140, the user property information may be provided to a security policy provider, typically a server operated remotely across one or more intervening networks. A Recommendation Engine of the security policy provider may obtain policy information in block 145 stored by the security policy provider or other vendors, using the obtained policy information together with the user property information to determine recommended security policies.

As part of that determination, in one embodiment a computer expertise level may be calculated to determine a level of assistance necessary to assist the user in configuration suggestions and settings.

The recommended security policies are then sent from the Recommendation Engine system in block 150 to the home user, where those policies may be used to configure security or other software according to the recommended security policies. These security policies may be any desired policy related to security. For example, a security policy appropriate for a home network router may define settings for wireless security, including whether to broadcast the service set identification (SSID), what kind of encryption to use, etc. Security policies for a network browser may include settings such as a security level for a zone, whether to allow unsigned components to execute, etc. Security policies for a firewall may include settings such as ports to allow or block. Security policies for anti-malware software may include settings such as how often to run scans for malware and whether to enable real-time anti-malware protection. Any desired security policies for any desired software may be recommended.

In one embodiment, a home security gateway appliance may implement the techniques described above. In other embodiments, other home computer systems that are used for day-to-day activities may perform the techniques describe above, with or without user intervention. In some embodiments, some or all of the security policies recommended by the Recommendation Engine may be implemented automatically, without user intervention. In some embodiments, at least some of the security policies may require user action to implement, and instructions that may be tailored to the user's computer expertise level may be provided to instruct or guide the user in implementing the recommended settings.

In one embodiment, in addition to gather user property information based on a person's identity in one or more social media networks, information regarding the person's devices and installed software may be used to guide the Recommendation Engine's determination of recommended security policies. In block 125, devices used by the user may be identified. These devices may include mobile devices. The devices identified may include personal devices typically not shared by the user, such as a smartphone, and devices that the user may share with other users of the home, such as a desktop computer. The devices may also include infrastructure devices used by the user, such as routers and network gateway devices that are used to connect a home network to the Internet or other networks. Once the devices are identified, in block 130 those devices may be queried to determine what software is installed on those devices. This software may include software specifically oriented toward security, such as firewalls and anti-malware software, but may also include other software that may have security-related parameters or settings, such as a web browser. The results of the query may be used in block 135 to determine the software used by the user, which may be provided to the Recommendation Engine in block 140 along with the other user properties.

Because recommended settings may in some cases not meet the individual's needs, in one embodiment a user may modify the settings of the recommended security policies, either before implementation or afterwards. Where modification before implementation is allowed, embodiments typically display or otherwise notify the user of the recommended security policies and the settings needed to implement those policies, and allow the user to accept, modify, or refuse those recommended policies. Where modification after implementation is allowed, embodiments may provide hooks to detect such modifications. The modifications, whether made before or after implementation of the recommended security policies, may then be provided back to the Recommendation Engine for further processing, as described below.

Figure 2:
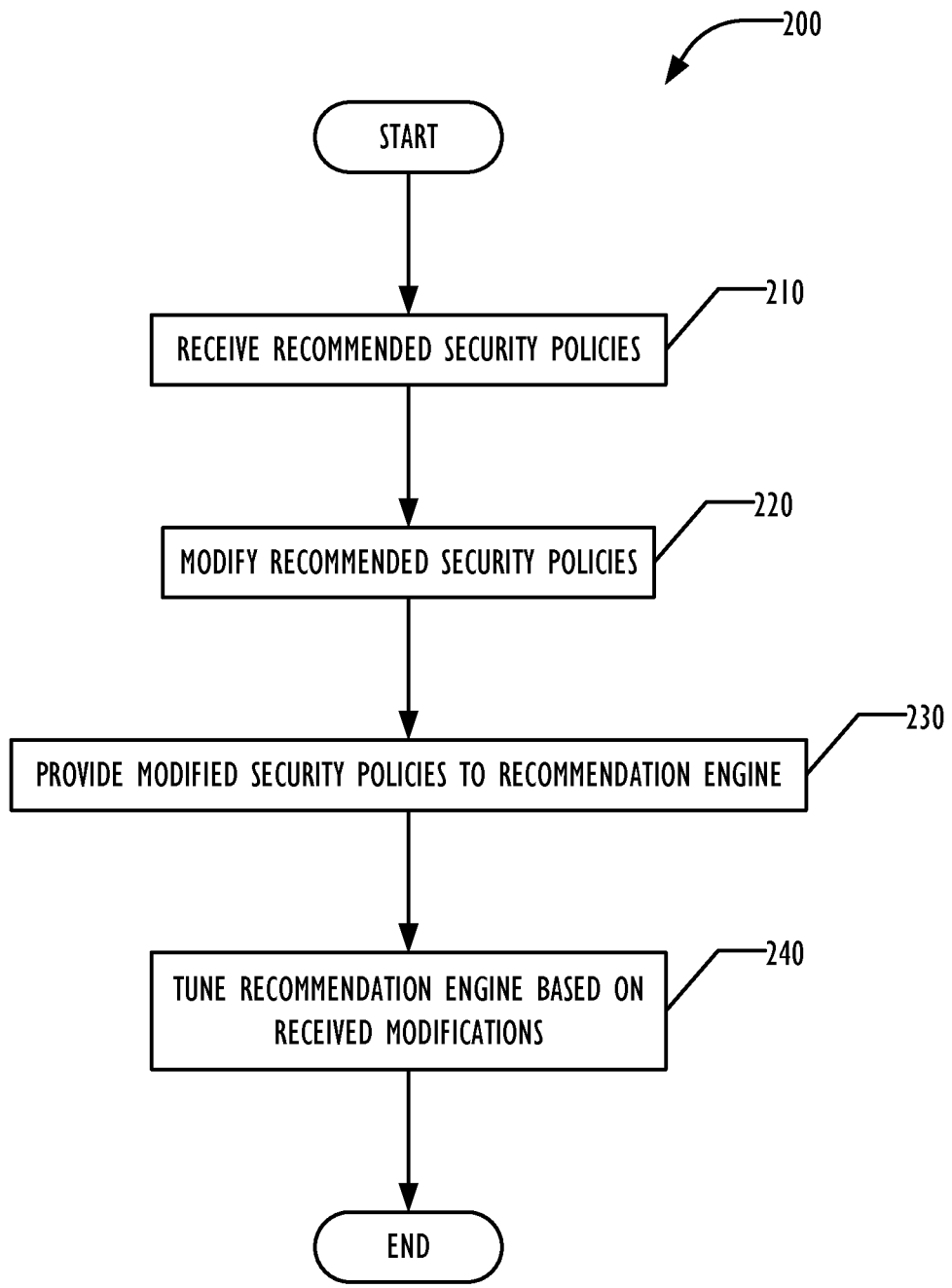
FIG. 2 is a flowchart illustrating using user modifications to policy recommendations to tune a recommendation engine according to one embodiment.

FIG. 2 is a flowchart 200 illustrating modification of recommended security policies according to one embodiment. In block 210, the home system receives the recommended security policies from the Recommendation Engine. In block 220, the recommended policies are modified, either before implementation or afterwards. In block 230, the modifications to the recommended policies are provided to the Recommendation Engine. In one embodiment, in addition to the modified security policies, other user information, such as the user properties originally sent to the Recommendation Engine in block 140 of FIG. 1, may be provided to the Recommendation Engine.

In block 240, the Recommendation Engine can be tuned based on the received modifications. In some embodiments, the modifications received are aggregated with other modifications received from users with similar properties, resulting in a change in the recommendations for users with those properties. Properties that may be used to categorize the users include age, language, geography, etc. For example, if users in a particular country often make similar modifications to the recommended security policies, the Recommendation Engine may be tuned to modify the recommended security policies to incorporate the modifications generally made in that country, eliminating the need for users to make their own modifications.

A typical house may have a plurality of programmable devices, using wired and wireless technologies for accessing local (home) networks and external networks such as the Internet. Some or all of these programmable devices may have the ability to configure settings related to security issues, whether or not labeled as a security setting, using a plurality of software and hardware technologies. Devices such as desktops, laptops, tablets, and smart phones are conventionally thought of as devices needing security protection, however, many other types of devices are being used in a home environment that require or desire network accessibility and which may require or take advantage of security policies for proper configuration. In some instances, the devices are intending to communicate only within a home (e.g., a wireless speaker) while in other instances the devices are intending to communicate via the Internet (e.g., security system with remote monitoring capability, smart meter sending information to electricity provider, etc.). There may be many different types of wired and wireless network technologies active in a single home. Some of the wireless technologies have very limited distances over which they communicate (e.g., BLUETOOTH®, ZIGBEE®) while other types of wireless technologies may communicate a more substantial distance (e.g., using WI- FI® technology). (BLUETOOTH is a registered trademark of Bluetooth SIG, Inc.; ZIGBEE is a registered trademark of ZigBee Alliance; and WI-FI is a registered certification mark of Wi-Fi Alliance.) Wired technologies include communication capabilities over power lines, cable provider networks, and phone company networks. A typical house will connect to the Internet using a modem configured for a digital subscriber line (DSL) network or a cable network which may also provide routing and other gateway functionality. Other less common Internet connection types are available (e.g., satellite) and this disclosure is not to be construed as to limited to a particular type of Internet connection. Once a device of any type connects to a network that is in turn connected to an external network such as the Internet there may be a security threat to both the device and the network because someone could attempt to infiltrate the network or device with some sort of malware.

Figure 3:
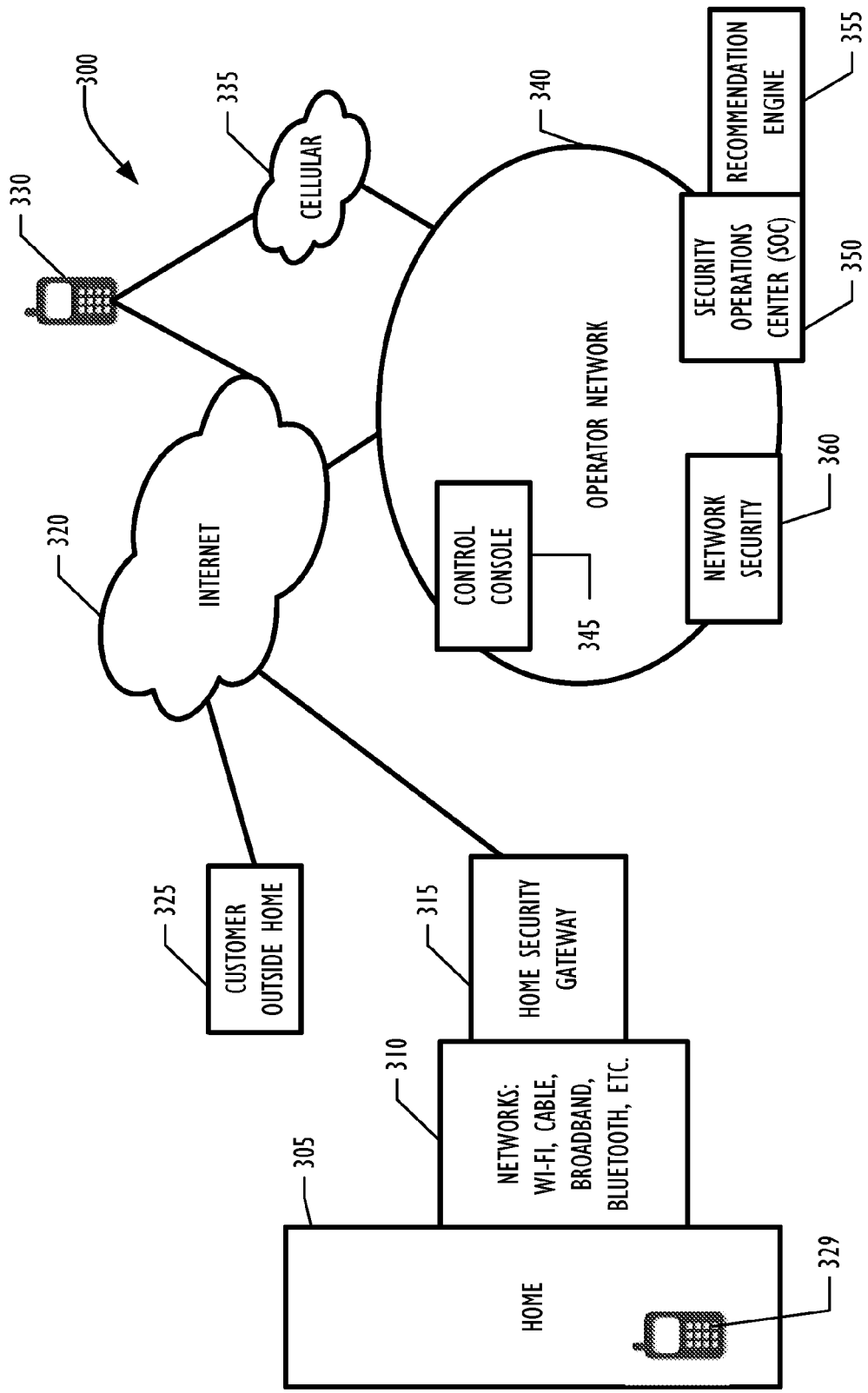
FIG. 3 is a block diagram illustrating a security gateway appliance configured to interact with a recommendation engine according to one embodiment.

In one embodiment, a security gateway appliance may employ the disclosed techniques to interact with both the home programmable devices and the recommendation engine. In such an embodiment, the security gateway device may collect the information described in block 105-135 of FIG. 1, query the security service provider in block 140, then interact with the home devices to reconfigure them as in block 150. Referring now to FIG. 3 and network diagram 300, home 305 contains a plurality of networks 310 and employs a security gateway device or appliance 315 according to one embodiment. Mobile device 329 is illustrated as an example home programmable device. Security gateway device 315 may attempt to protect the home devices and networks inside home 305 in a variety of ways, including setting security policies and promulgating security policies to the devices and networks protected by the security gateway device 315. Security gateway device 315 may be installed "in-line" such that any device connected to any of the home networks may only communicate to the Internet 320 by communicating through the security gateway device 315, thus providing gateway functionality for the home. For example, the security gateway device 315 may be bundled into a cable modem or DSL modem, or may be provided as a separate appliance, typically on the home side of the cable modem or DSL modem, through which all communications with the home passes. Alternatively, security gateway device 315 may be installed as a wired or wireless network device that monitors other connected devices without being directly in-line with Internet communication. Typically, the homeowner or someone else in the family or group of people sharing the home subscribes to security services from the security services provider that operates the recommendation engine. The security services provider is therefore a security policy provider, in addition to a provider of any other security services. In some scenarios, the security services provider may contract for access to a recommendation engine provided by a third party, but for clarity of the description below, the recommendation engine is described as provided by the security services provider.

Security gateway device 315 communicates via the Internet 320 to provide an interface to an authorized user. For example, the customer or homeowner outside of their home 325 may be able to communicate with the security gateway device 315, either directly or via communicating with a control console 345 maintained by the security services provider, to receive comprehensive information about and from the security gateway device 315. Customers may alternatively use a smartphone or other mobile device 330 to communicate with control console 345 or security gateway device 315 via a cellular network 335 or Internet 320. Thus, the recommended security policies corresponding to a subscriber may be communicated directly to the subscriber's programmable device 330 using a cellular network such that security policies may be updated or provided even when the subscriber is not connected to the Internet 320.

When the customer is at home with their smartphone or other mobile device (illustrated by mobile phone 329) or any other programmable device in the home 305, they may have access to the security gateway appliance 315 and subscriber applications via a plurality of networks not available when outside the home. The security gateway device 315 may also communicate with an operator network 340 to report status and receive configuration updates.

If the same device is connected via a WI-FI network and visible to security gateway device 315, then connects via a cellular network 335 (not visible to security gateway device 315), the security services provider may be able to correlate that device and its two different connection types. Similarly a car dashboard may connect via a cellular network which is visible to the SOC 350 and not to security gateway device 315. The security service provider may thus produce and provide sets of recommended security policies for a customer irrespective of whether the devices were monitored by security gateway device 315 (when at home) or via SOC 350 (when roaming). This may be useful in scenarios where a $3^{rd}$ party (e.g., a network provider) is configured to provide the recommendation engine. The security services provider and $3^{rd}$ party recommendation engine provider may then protect the home network using security gateway device 315 to provide recommended security policies to home network connected devices, and roaming devices (like cars and phones) using the security gateway device 315. In some embodiments, the recommendation engine may combine events from both the security gateway device 315 and the SOC 350 for generating different security policies based on how the customer's device is connected.

Operator network 340 may include the control console 345, a security operations center (SOC) 350 that provides or interfaces with the security services provider's recommendation engine 355, and other network or computer security functionality 360. A proprietary communication protocol may be used in some embodiments to communicate between the security gateway device 315 and the SOC 350. This may allow operators to deliver recommended security policies to their customers using the proprietary communication protocol, instead of standard communication protocols such as Internet Protocol (IP)-based protocols.

Figure 4:
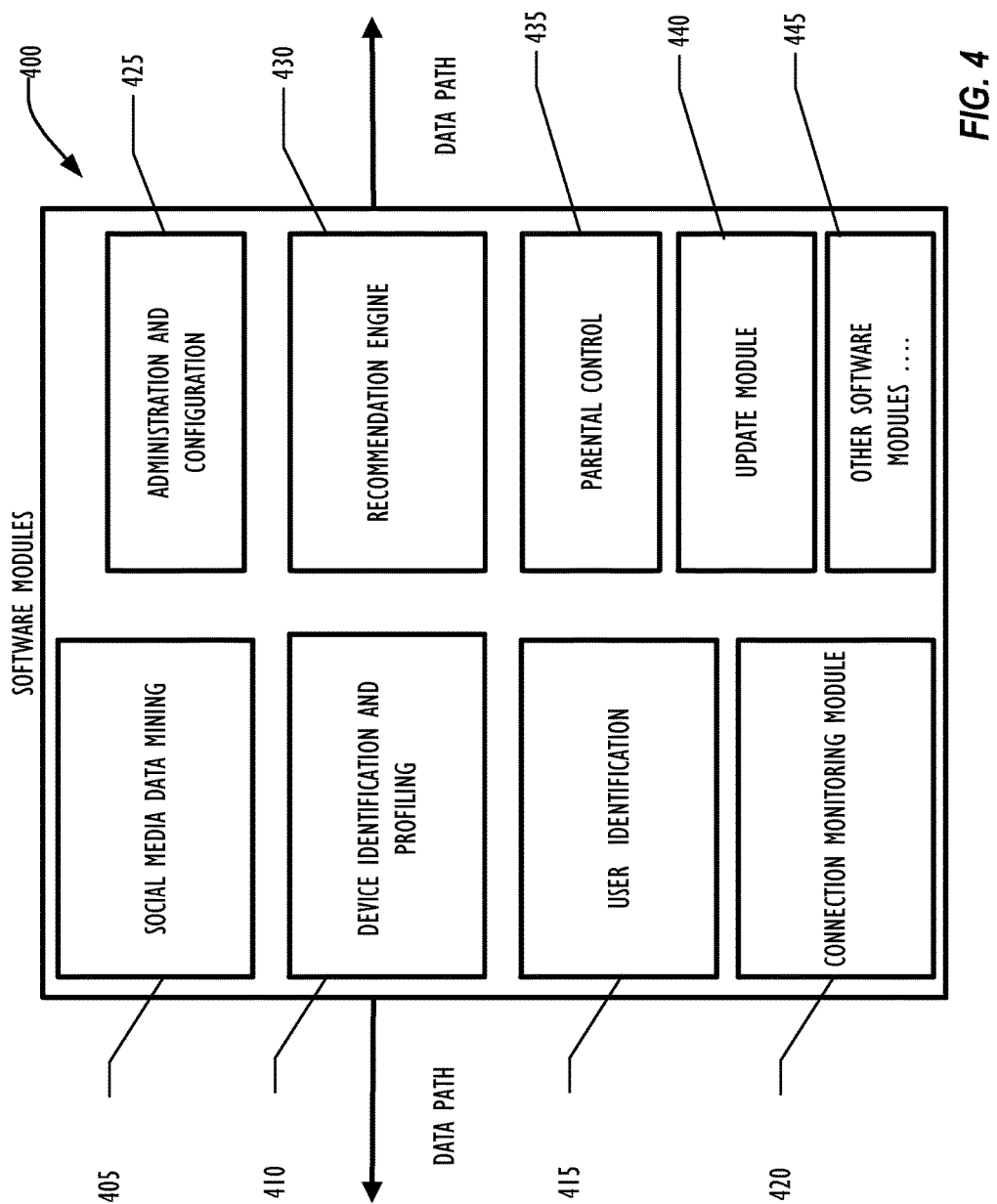
FIG. 4 is a block diagram illustrating different functional modules to support the one embodiment.

FIG. 4 illustrates in block diagram 400 some possible functional modules that could be included in the security gateway device 315 according to one embodiment. These functional modules are illustrative and by way of example only and other functional modules or modules performing combined or split functions are possible within the scope of this disclosure. Security gateway device 315 may include and be configured to execute a social media data mining module 405. The social media data mining module 405 may be configured to gather data from social media networks such as the FACEBOOK® network (FACEBOOK is a registered trademark of Facebook, Inc.) for use by the recommendation engine 430. The social media data mining module 405 may be configured to use only publicly available social media network information or alternatively, may be provided with login or other identification information to allow the social media data mining module to access profile or other personal non-public information from the social media network.

Security gateway device 315 may also be configured with a device identification and profiling module 410. The device identification and profiling module 410 may be enabled and work by default with a configuration option to disable active fingerprinting. Periodic fingerprinting information may be obtained from SOC 350. The device identification and profiling module 410 may gather information passively about connected devices to determine their identity, configuration and capabilities or may query a connected device to gather this type of information. Devices that have previously connected to the network protected by security gateway device 315 may be remembered when they reconnect and information about that device may be updated. Knowing which devices are connected to the network may allow the security gateway device 315 to ensure that each connected device is maintained with properly installed and up to date endpoint protection software.

The recommendation engine module 430 processes the information collected from social media data mining and from device and software data mining and produces recommended security policies based on information supplied by the security services provider. In some embodiments, the recommendation engine module 430 of the security gateway device 315 does not generate the recommended security policies, but sends information to the security service providers remote recommendation engine 355 to generate the security policies, received the recommended security policies from the security services provider's recommendation engine, and processes the received security policies, implementing them in one or more of the security gateway device 315 and the connected home programmable devices, including sending instructions to the home programmable devices to implement the relevant security policies.

A user identification module 415 may provide the functionality for the security gateway device 315 to obtain information about the user for use in determining what security policies should be applied and for providing to the social media data mining module. A connection monitoring module 420 may allow the security gateway device 315 to monitor connections made to the home networks by homeowner devices, including guest devices that the homeowner may allow to access the home networks. Upon detecting a connection, the security gateway device 315 may identify the connected device and its installed software, as recited in the discussion of FIG. 1.

Security gateway device 315 may also be configured with one or more of an administration and configuration module 425, an update module 440, a parental control module 435, and other software modules 445. Each of these modules performs its corresponding functions to assist in protecting the subscriber's network. The administration and configuration module 425 may provide administrative and configuration capability for the security gateway device 315. The parental control module 435 may allow a subscriber to maintain parental controls via the subscriber interface remotely. Parental controls may include day/time rules regarding access to Internet sites and to social media sites. For example, a subscriber could configure the security gateway device 315 to prevent access to social media sites or email during certain hours of the day, days of the week, or a combination thereof etc. for a particular userid (either on the network or on the social media application). The update module 440 may allow the security gateway device 315 to update itself as updated software or firmware is made available for it.

In summary, a security gateway device 315 configured according to the one or more disclosed embodiments could provide enterprise grade security policies for a home network using information gathered about the users' activities in one or more social networks. The protected home network could benefit from a service provided by the recommendation engine 430/355 to provide a level of service to the average home owner that would not be available without a device configured such as security gateway device 315. The security gateway device 315 may facilitate cloud based management of itself and the network it protects and may support proactive endpoint software upgrades to ensure that all endpoints (home programmable devices) are protected with appropriate security policies for home users. If desired the security gateway device 315 may assist protecting endpoints by redirecting them to distribution points for the necessary endpoint protection software and updates to that software, in addition to security policies and updates to those policies. The security gateway device 315 also may provide comprehensive auditing and reporting information for a subscriber so that the subscriber may have an accurate picture of all devices connected to the home networks 310. Identified devices may be included in the report with particular details as determined by a device profiling module. The security gateway device 315 may also provide intrusion protection alerts and simple notifications when new devices attempt to connect to a protected network, as well as any other desired security-related functionality.

Figure 5:
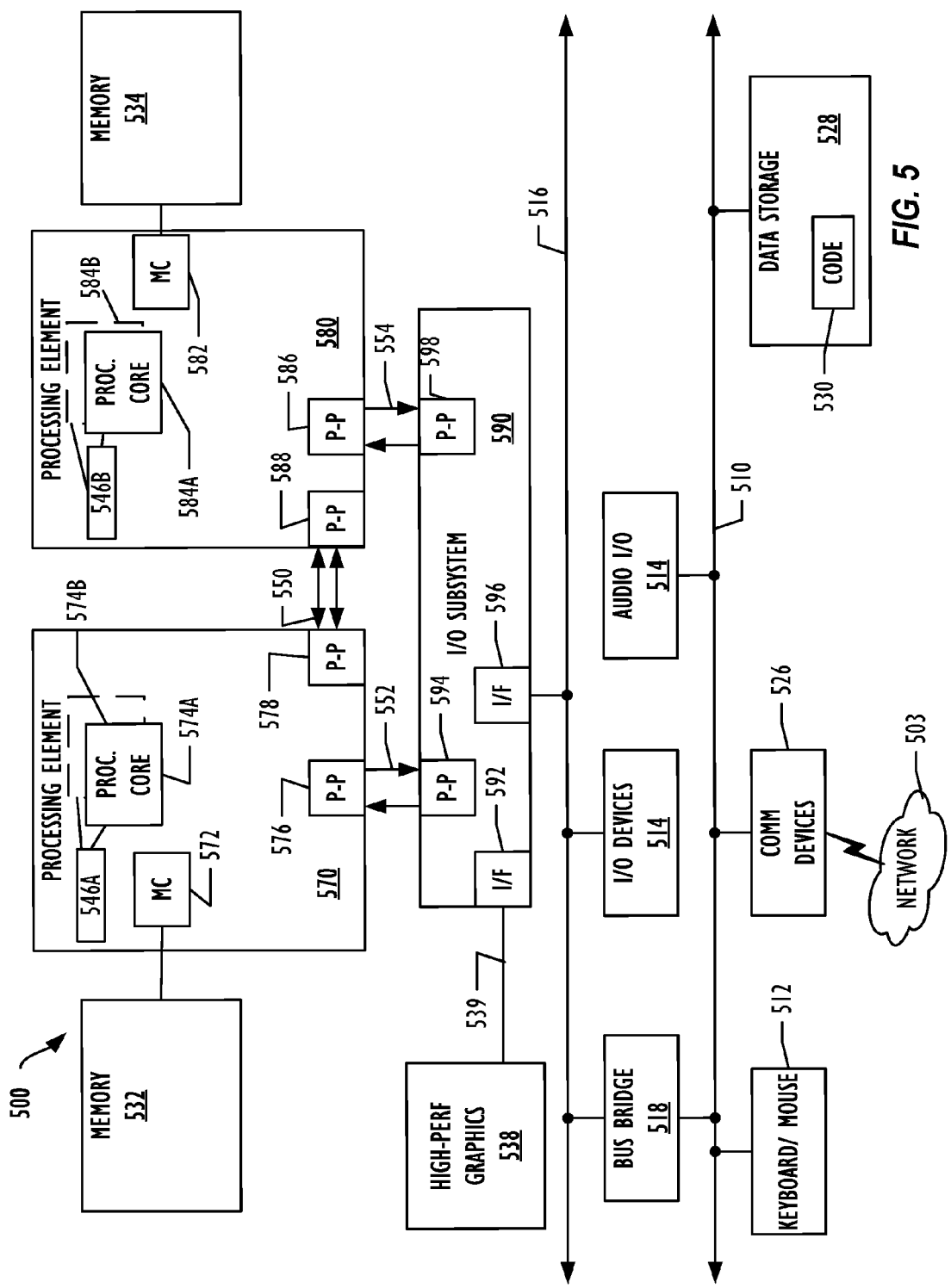
FIG. 5 is a block diagram illustrating a programmable device for use with techniques described herein according to one embodiment.

Referring now to FIG. 5, a block diagram illustrates a programmable device 500 that may be used within an security gateway device 315 or a security services provider's recommendation engine 355 in accordance with one embodiment. The programmable device illustrated in FIG. 5 is a multiprocessor programmable device 500 that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-9. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between the processing elements 570, 580 in terms of a spectrum of metrics of merit including architectural, microarchitectural, thermal, power consumption characteristics, and the like. These differences may effectively manifest themselves as asymmetry and heterogeneity amongst the processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple the processing elements 570, 580 to respective memories, namely a memory 532 and a memory 534, which may be portions of main memory locally attached to the respective processors. While MC logic 572 and 582 is illustrated as integrated into the processing elements 570, 580, in some embodiments the MC logic may be discrete logic outside the processing elements 570, 580 rather than integrated therein.

Processing element 570 and processing element 580 may be coupled to an I/O subsystem 590 via P-P interconnects 576, 586 and 584, respectively. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, bus 549 may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514 may be coupled to first link 516, along with a bridge 518 which may couple first link 516 to a second link 510. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second bus 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. Also, the elements of FIG. 5 may alternatively be partitioned using more or fewer integrated chips than illustrated in FIG. 5.

Figure 6:
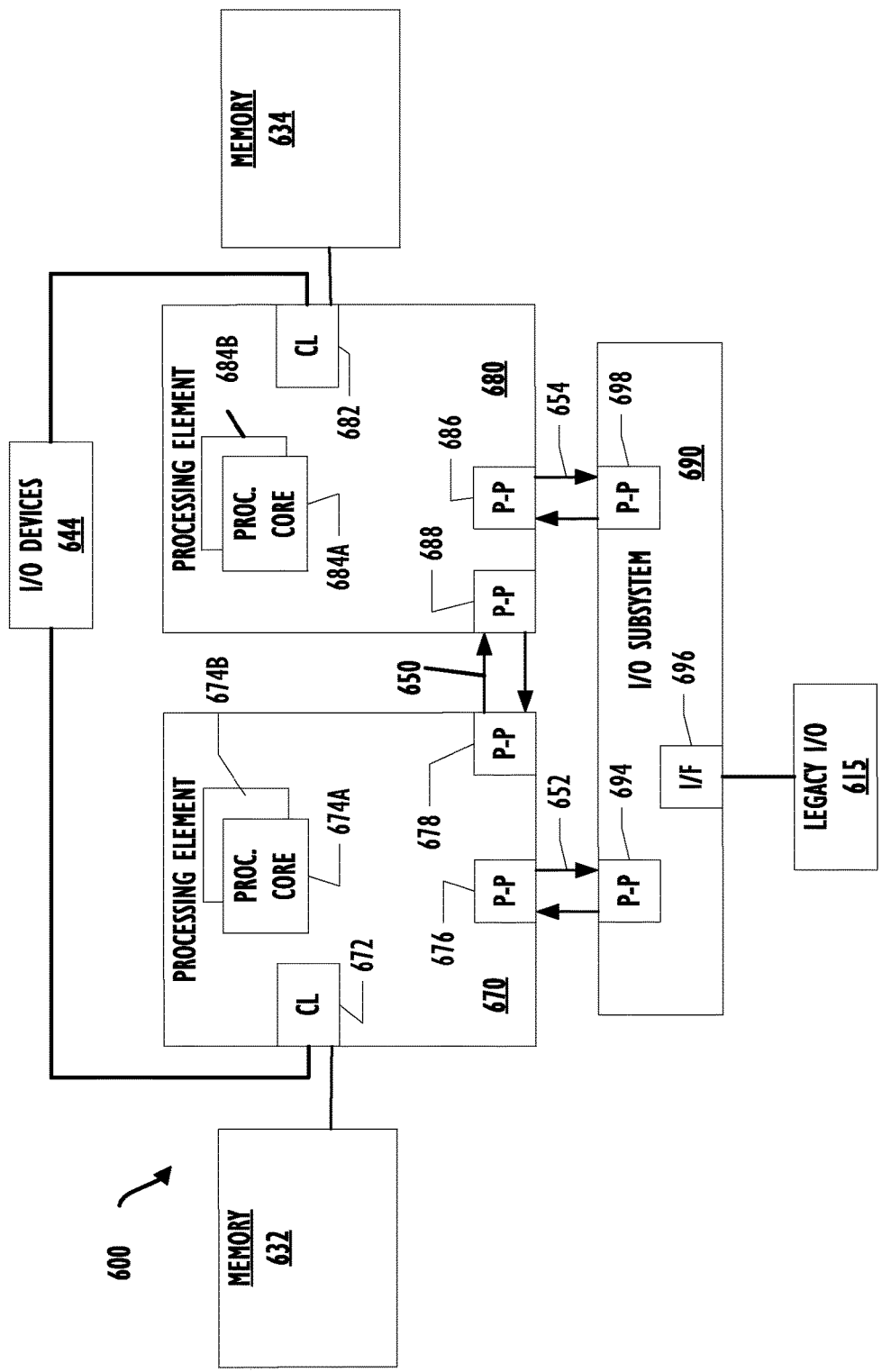
FIG. 6 is a block diagram illustrating a programmable device for use with techniques described herein according to another embodiment.

Referring now to FIG. 6, a block diagram illustrates a programmable device 600 according to another embodiment. Certain aspects of FIG. 5 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the CL 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A, and 684B. As illustrated in FIG. 6, I/O subsystem 690 includes P-P interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. It will be appreciated that various components of the programmable devices depicted in FIGS. 5 and 6 may be combined in a system-on-a-chip (SoC) architecture.

The following examples pertain to further embodiments.

Example 1 is a machine-readable medium on which are stored instructions, including instructions that when executed, cause a programmable device to: identify a user within a first social network; collect properties corresponding to the user in the first social network; request a set of security policies from a security policy provider responsive to the collected properties; and receive a set of recommended security policies from the security policy provider.

In Example 2, the subject matter of Example 1 further includes instructions that when executed cause the programmable device to: identify a user within a second social network; collect properties corresponding to the user in the second social network; and aggregate the properties corresponding to the user in the first social network and the properties corresponding to the user in the second social network, wherein the instructions to request a set of security policies include instructions that when executed cause the programmable device to request the set of security policies from the security policy provider responsive to the aggregated properties.

In Example 3, the subject matter of Example 1 further includes instructions that when executed cause the programmable device to: identify a device associated with the user; and identify a security software installed on the device, wherein the instructions that when executed cause the programmable device to request a set of security policies include instructions that when executed cause the programmable device to: request a set of security policies from the security policy provider responsive to the collected properties and the identified security software.

In Example 4, the subject matter of any of Examples 1-3 further includes instructions that when executed cause the programmable device to: configure a computer security software responsive to the recommended set of security policies.

In Example 5, the subject matter of Example 4 further includes instructions that when executed cause the programmable device to: modify the recommended set of security policies based on received modifications.

In Example 6, the subject matter of Example 5 further includes instructions that when executed cause the programmable device to: send the modified recommended set of security policies and the collected properties to the security policy provider.

Example 7 is a security appliance, including: a processor; a memory, coupled to the processor; and software, stored on the memory, including instructions that when executed cause the processor to: identify a user within a first social network; collect properties corresponding to the user in the first social network; request a set of security policies from a security policy provider responsive to the collected properties; receive a set of recommended security policies from the security policy provider; and configure the security appliance to enforce the recommended set of security policies.

Example 8 includes the subject matter of Example 7, wherein the software further includes instructions that when executed cause the processor to: identify a device associated with the user connected to an external network via the security appliance; identify a security software installed on the device; and wherein the instructions that when executed cause the processor to request a set of security policies include instructions that when executed cause the processor to: request a set of security policies from the security policy provider responsive to the collected properties and the identified security software.

Example 9 includes the subject matter of Example 8, wherein the software further includes instructions that when executed cause the processor to: send instructions to the security software installed on the device that when executed cause the device to configure the security software to comply with the recommended set of security policies.

Example 10 includes the subject matter of any of Examples 7-8, wherein the software further includes instructions that when executed cause the processor to: receive modifications to the recommended set of security policies; and send the modifications to the security policy provider.

Example 11 includes the subject matter of any of Examples 7-8, wherein the software further includes instructions that when executed cause the processor to: identify a user within a second social network; collect properties corresponding to the user in the second social network; and aggregate the properties corresponding to the user in the first social network and the properties corresponding to the user in the second social network, wherein the instructions to request a set of security policies include instructions that when executed cause the processor to request the set of security policies from the security policy provider responsive to the aggregated properties.

Example 12 is a security policy provider system, including: a processor; memory, coupled to the processor; and software, stored on the memory, including instructions that when executed cause the processor to: receive properties corresponding to a user of a programmable device; receive a request for security policies; determine a recommended set of security policies response to the received properties; and send the recommended set of security policies responsive to the request.

Example 13 includes the subject matter of Example 12, wherein the properties include properties corresponding to a user within a social network.

Example 14 includes the subject matter of Example 13, wherein the recommended set of security policies include settings for configuring interaction with the social network.

Example 15 includes the subject matter of any of Examples 12-14, wherein the properties identify a security software installed on the programmable device.

Example 16 includes the subject matter of Example 15, wherein the recommended set of security policies include policies for configuring the security software.

Example 17 is a method of configuring a security gateway appliance, including: identifying a user within a social network; collecting properties corresponding to the user in the social network; requesting a set of security policies from a security policy provider responsive to the collected properties; and receiving a set of recommended security policies from the security policy provider.

In Example 18, the subject matter of Example 17 further includes: identifying a device associated with the user connected to an external network via the security gateway appliance; and identifying a security software installed on the device, wherein requesting a set of security policies includes requesting a set of security policies responsive to the collected properties and the identified security software.

In Example 19, the subject matter of Example 18 further includes: sending configuration instructions to the security software responsive to the set of recommended security policies.

In Example 20, the subject matter of any of Examples 17-19 further includes: receiving modifications to the set of recommended security policies; and sending the modifications to the security policy provider.

In Example 21, the subject matter of any of Examples 17-19 further includes: configuring a security gateway appliance responsive to the recommended set of security policies.

Example 22 includes the subject matter of any of Examples 17-19, wherein identifying a user within a social network includes: identifying the user within a plurality of social networks, wherein collecting properties corresponding to the user in the social network includes: collecting properties corresponding to the user in each of the plurality of social networks; and aggregating the properties, and wherein requesting a set of security policies includes: requesting a set of security policies from the security policy provider responsive to the aggregated properties.

Example 23 is a security appliance, including: means for identifying a user within a first social network; means for collecting properties corresponding to the user in the first social network; means for requesting a set of security policies from a security policy provider responsive to the collected properties; means for receiving a set of recommended security policies from the security policy provider; and means for configuring the security appliance to enforce the recommended set of security policies.

In Example 24, the subject matter of Example 23 further includes: means for identifying a device associated with the user connected to an external network via the security appliance; means for identifying a security software installed on the device; and wherein means for requesting a set of security policies include: means for requesting a set of security policies from the security policy provider responsive to the collected properties and the identified security software.

In Example 25, the subject matter of Example 24 further includes: means for sending instructions to the security software installed on the device that when executed cause the device to configure the security software to comply with the recommended set of security policies.

Example 26 is a security appliance, including: means for identifying a user within a first social network; means for collecting properties corresponding to the user in the first social network; means for requesting a set of security policies from a security policy provider responsive to the collected properties; means for receiving a set of recommended security policies from the security policy provider; and means for configuring the security appliance to enforce the recommended set of security policies.

In Example 27, the subject matter of Example 26 further includes: means for identifying a device associated with the user connected to an external network via the security appliance; means for identifying a security software installed on the device; and wherein means for requesting a set of security policies include: means for requesting a set of security policies from the security policy provider responsive to the collected properties and the identified security software.

In Example 28, the subject matter of Example 27 further includes: means for sending instructions to the security software installed on the device that when executed cause the device to configure the security software to comply with the recommended set of security policies.

In Example 29, the subject matter of Example 27 further includes: means for identifying a user within a second social network; means for collecting properties corresponding to the user in the second social network; and means for aggregating the properties corresponding to the user in the first social network and the properties corresponding to the user in the second social network, wherein the means for requesting a set of security policies include means for requesting the set of security policies from the security policy provider responsive to the aggregated properties.

In Example 30, the subject matter of Example 27 further includes: means for identifying a device associated with the user; and means for identifying a security software installed on the device, wherein the means for requesting a set of security policies include: means for requesting a set of security policies from the security policy provider responsive to the collected properties and the identified security software.

In Example 31, the subject matter of any of Examples 26-30 further includes: means for configuring a computer security software responsive to the recommended set of security policies.

In Example 32, the subject matter of any of Examples 26-30 further includes instructions that when executed cause the programmable device to: modify the recommended set of security policies based on received modifications.

In Example 33, the subject matter of Example 32 further includes instructions that when executed cause the programmable device to: send the modified recommended set of security policies and the collected properties to the security policy provider.

Example 34 is a machine-readable medium on which are stored instructions, including instructions that when executed, cause a programmable device to: identify a user within a first social network; collect properties corresponding to the user in the first social network; request a set of security policies from a security policy provider responsive to the collected properties; and receive a set of recommended security policies from the security policy provider.

In Example 35, the subject matter of Example 34 further includes instructions that when executed cause the programmable device to: identify a user within a second social network; collect properties corresponding to the user in the second social network; and aggregate the properties corresponding to the user in the first social network and the properties corresponding to the user in the second social network, wherein the instructions to request a set of security policies include instructions that when executed cause the programmable device to request the set of security policies from the security policy provider responsive to the aggregated properties.

In Example 36, the subject matter of any of Examples 34-35 further includes instructions that when executed cause the programmable device to: identify a device associated with the user; and identify a security software installed on the device, wherein the instructions that when executed cause the programmable device to request a set of security policies include instructions that when executed cause the programmable device to: request a set of security policies from the security policy provider responsive to the collected properties and the identified security software.

In Example 37, the subject matter of any of Examples 34-36 further includes instructions that when executed cause the programmable device to: send a modified recommended set of security policies and the collected properties to the security policy provider.

Example 38 is a security appliance, including: a processor; a memory, coupled to the processor; and software, stored on the memory, including instructions that when executed cause the processor to: identify a user within a first social network; collect properties corresponding to the user in the first social network; request a set of security policies from a security policy provider responsive to the collected properties; receive a set of recommended security policies from the security policy provider; configure the security appliance to enforce the recommended set of security policies; and receive modifications to the recommended set of security policies; and send the modifications to the security policy provider.

Example 39 includes the subject matter of Example 38, wherein the software further includes instructions that when executed cause the processor to: identify a device associated with the user connected to an external network via the security appliance; identify a security software installed on the device; and wherein the instructions that when executed cause the processor to request a set of security policies include instructions that when executed cause the processor to: request a set of security policies from the security policy provider responsive to the collected properties and the identified security software.

Example 40 includes the subject matter of Example 39, wherein the software further includes instructions that when executed cause the processor to: send instructions to the security software installed on the device that when executed cause the device to configure the security software to comply with the recommended set of security policies.

Example 41 includes the subject matter of any of Examples 38-40, wherein the software further includes instructions that when executed cause the processor to: identify a user within a second social network; collect properties corresponding to the user in the second social network; and aggregate the properties corresponding to the user in the first social network and the properties corresponding to the user in the second social network, wherein the instructions to request a set of security policies include instructions that when executed cause the processor to request the set of security policies from the security policy provider responsive to the aggregated properties.

Example 42 is a security policy provider system, including: a processor; memory, coupled to the processor; and software, stored on the memory, including instructions that when executed cause the processor to: receive properties corresponding to a user of a programmable device; receive a request for security policies; determine a recommended set of security policies response to the received properties; and send the recommended set of security policies responsive to the request, wherein the properties include properties corresponding to a user within a social network.

Example 43 includes the subject matter of Example 42, wherein the recommended set of security policies include settings for configuring interaction with the social network.

Example 44 includes the subject matter of any of Examples 42-43, wherein the properties identify a security software installed on the programmable device.

Example 45 is a configuring a security gateway appliance, including: identifying a user within a social network; collecting properties corresponding to the user in the social network; requesting a set of security policies from a security policy provider responsive to the collected properties; receiving a set of recommended security policies from the security policy provider; and receiving modifications to the set of recommended security policies; and sending the modifications to the security policy provider.

In Example 46, the subject matter of Example 45 further includes: identifying a device associated with the user connected to an external network via the security gateway appliance; identifying a security software installed on the device; and sending configuration instructions to the security software responsive to the set of recommended security policies, wherein requesting a set of security policies includes requesting a set of security policies responsive to the collected properties and the identified security software.

Example 47 includes the subject matter of any of Examples 45-46, wherein identifying a user within a social network includes: identifying the user within a plurality of social networks, wherein collecting properties corresponding to the user in the social network includes: collecting properties corresponding to the user in each of the plurality of social networks; and aggregating the properties, and wherein requesting a set of security policies includes: requesting a set of security policies from the security policy provider responsive to the aggregated properties.

Example 48 is a security appliance, including means for performing a method as Exampleed in any of Examples 45-47.

The above description and examples are intended to be illustrative, and not restrictive. All features of any apparatus described above may also be implemented with respect to any method or process described herein. Specifics in the examples may be used anywhere in one or more embodiments. For example, the above-described embodiments may be used in combination with each other. Many other embodiments will be apparent to those of skill in the art upon reviewing the above description.

We claim:

1. A non-transitory machine-readable medium on which are stored instructions, comprising instructions that when executed, cause a programmable device to:
   identify a user within a first social network;
   collect properties corresponding to a social graph of the user in the first social network;
   request a set of security policies from a security policy provider responsive to the collected properties;
   receive a set of recommended security policies from the security policy provider; and
   configure a computer security software of the programmable device responsive to the recommended set of security policies, wherein the computer security software is programmed to protect a device or a network associated with the user other than the programmable device.

2. The machine-readable medium of claim 1, further comprising instructions that when executed cause the programmable device to:
   identify the user within a second social network;
   collect properties corresponding to a social graph of the user in the second social network; and
   aggregate the properties corresponding to the social graph of the user in the first social network and the properties corresponding to the social graph of the user in the second social network, wherein the instructions to request a set of security policies comprise instructions that when executed cause the programmable device to request the set of security policies from the security policy provider responsive to the aggregated properties.

3. The machine-readable medium of claim 1, further comprising instructions that when executed cause the programmable device to:
   identify a device associated with the user; and
   identify a security software installed on the device,
   wherein the instructions that when executed cause the programmable device to request a set of security policies comprise instructions that when executed cause the programmable device to:
      request a set of security policies from the security policy provider responsive to the collected properties and the identified security software.

4. The machine-readable medium of claim 1, further comprising instructions that when executed cause the programmable device to:
   modify the recommended set of security policies based on received modifications.

5. The machine-readable medium of claim 4, further comprising instructions that when executed cause the programmable device to:
   send the modified recommended set of security policies and the collected properties to the security policy provider.

6. A security appliance, comprising:
   a hardware processor;
   a memory, coupled to the processor; and
   software, stored on the memory, comprising instructions that when executed cause the processor to:
      identify a user within a first social network;
      collect properties corresponding to a social graph of the user in the first social network;
      request a set of security policies from a security policy provider responsive to the collected properties;
      receive a set of recommended security policies from the security policy provider; and
      configure the security appliance to enforce the recommended set of security policies to protect a device or a network associated with the user other than the security appliance.

7. The security appliance of claim 6, wherein the software further comprises instructions that when executed cause the processor to:
   identify a device associated with the user connected to an external network via the security appliance;
   identify a security software installed on the device; and
   wherein the instructions that when executed cause the processor to request a set of security policies comprise instructions that when executed cause the processor to:
      request a set of security policies from the security policy provider responsive to the collected properties and the identified security software.

8. The security appliance of claim 7, wherein the software further comprises instructions that when executed cause the processor to:
    send instructions to the security software installed on the device that when executed cause the device to configure the security software to comply with the recommended set of security policies.

9. The security appliance of claim 6, wherein the software further comprises instructions that when executed cause the processor to:
    receive modifications to the recommended set of security policies; and
    send the modifications to the security policy provider.

10. The security appliance of claim 6, wherein the software further comprises instructions that when executed cause the processor to:
    identify the user within a second social network;
    collect properties corresponding to a social graph of the user in the second social network; and
    aggregate the properties corresponding to the social graph of the user in the first social network and the properties corresponding to the social graph of the user in the second social network, wherein the instructions to request a set of security policies comprise instructions that when executed cause the processor to request the set of security policies from the security policy provider responsive to the aggregated properties.

11. A security policy provider system, comprising:
    a hardware processor;
    memory, coupled to the processor; and
    software, stored on the memory, comprising instructions that when executed cause the processor to:
        receive properties corresponding to a social graph of a user within a social network of a programmable device from a security gateway device other than the programmable device that protects the programmable device, wherein the security gateway device is separate from the programmable device;
        receive a request for security policies from the security gateway device;
        determine a recommended set of security policies response to the received properties; and
        send the recommended set of security policies to the security gateway device responsive to the request, wherein the recommended set of security policies comprise policies for configuring the security gateway device.

12. The security policy provider system of claim 11, wherein the recommended set of security policies comprise settings for configuring interaction with the social network.

13. The security policy provider system of claim 11, wherein the properties identify a security software installed on the programmable device.

14. A method of configuring a security gateway appliance, comprising:
    identifying a user within a social network;
    collecting properties corresponding to a social graph of the user in the social network;
    requesting a set of security policies from a security policy provider responsive to the collected properties;
    receiving a set of recommended security policies from the security policy provider; and
    configuring the security gateway appliance responsive to the recommended set of security policies to protect a device or a network associated with the user other than the security gateway appliance.

15. The method of claim 14, further comprising:
    identifying a device associated with the user connected to an external network via the security gateway appliance; and
    identifying a security software installed on the device,
    wherein requesting a set of security policies comprises requesting a set of security policies responsive to the collected properties and the identified security software.

16. The method of claim 15, further comprising:
    sending configuration instructions to the security software responsive to the set of recommended security policies.

17. The method of claim 14, further comprising:
    receiving modifications to the set of recommended security policies; and
    sending the modifications to the security policy provider.

18. The method of claim 14,
    wherein identifying the user within a social network comprises:
        identifying the user within a plurality of social networks,
    wherein collecting properties corresponding to the social graph of the user in the social network comprises:
        collecting properties corresponding to a social graph of the user in each of the plurality of social networks; and
        aggregating the properties, and wherein requesting a set of security policies comprises:
        requesting a set of security policies from the security policy provider responsive to the aggregated properties.

19. The security policy provider system of claim 11, wherein the instructions further comprise instructions that when executed cause the processor to:
    obtain security policies from a vendor of security policies.

* * * * *